A. P. BARLOW,

Assignor to JOHN H. SWARTWOUT.

Saw-Mill.

No. 9,122. Reissued Mar. 23, 1880.

Attest:
A. Barthel
Charles J. Kent

Inventor:
A. P. Barlow
By Atty
Thos. S. Sprague

N. PETERS, PHOTO-LITHOGRAPHER, WASHINGTON, D. C.

UNITED STATES PATENT OFFICE.

ASHBEL P. BARLOW, OF ST. JOSEPH, MICHIGAN, ASSIGNOR TO JOHN H. SWARTWOUT.

SAW-MILL.

SPECIFICATION forming part of Reissued Letters Patent No. 9,122, dated March 23, 1880.

Original No. 98,013, dated December 21, 1869. Application for reissue filed January 15, 1880.

*To all whom it may concern:*

Be it known that I, ASHBEL P. BARLOW, of St. Joseph, in the county of Berrien and State of Michigan, (formerly of Kalamazoo, Michigan,) have invented certain Improvements in Saw-Mills for Sawing Wood, of which the following is a full and exact description.

My invention relates to improvements in that kind of saw-mills known as "muley-mills," in which reciprocating saws are used, and the object is so to construct and arrange the operating parts that the saw, in the commencement of its downward reciprocation, will commence to cut the wood at the bottom or lower side of the log or stock with the lower teeth of the saw, and so that the saw, in its downward motion, will bring the next succeeding tooth above the first in contact with the wood, and so on, advancing each tooth of the saw in succession to the upper one, that strikes the wood by means of two (upper and lower) sets of straight guides—the upper set inclined, the lower perpendicular—which give the direction and relative position of the saw with the log, in connection with the manner of pivoting or attaching the lower end of the saw to the pitman.

Figure 1:
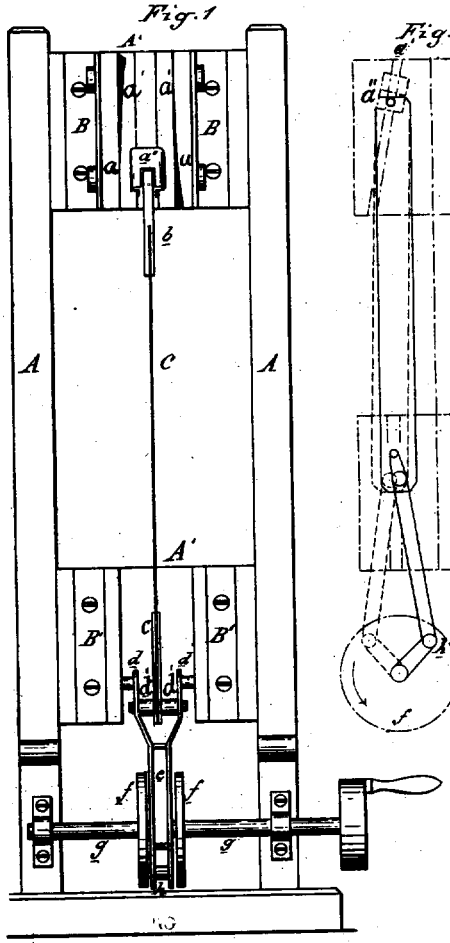
Figure 3:
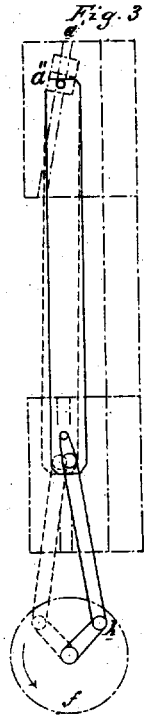
Figure 2:
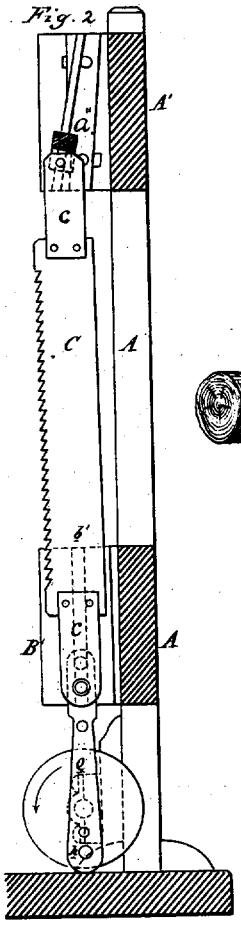
Figure 4:
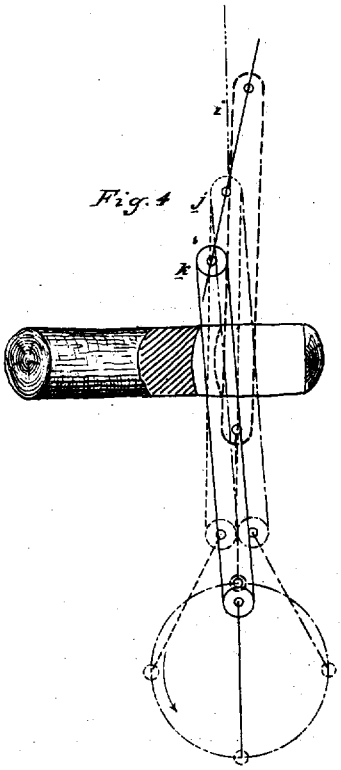
Figure 5:
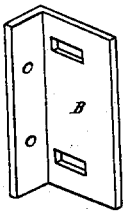
Figure 6:
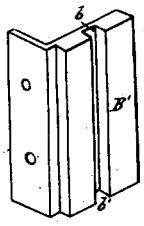

In the accompanying drawings, which form a part of this specification, Figure 1 is a front view of my invention. Fig. 2 is a side elevation. Fig. 3 shows the different positions of the bottom of the saw when the pitman is in different positions on the crank-wheel. Fig. 4 is another view of the saw at the different points of its downward reciprocation. Fig. 5 is a view of one side of the upper muley-head; and Fig. 6 is a view of one side of the lower muley-head, showing the grooves in which the guide-pin slides.

In the accompanying drawings, A represents the upright supporting-posts; A′ A′, the upper and lower cross-girders, and to which are attached the upper and lower muley-heads. B B are the two sides of the upper muley-head, to which are attached the adjustable plates *a a*, having the straight single inclined guides *a′ a′*, which are adjustable upon the muley-heads by means of set-screws and slots. $a^2$ is the cross-head, which is constructed to fit and slide freely upon the inclined guides *a′ a′*. *b* is the upper saw-buckle, that connects the saw C with the cross-head $a^2$. B′ B′ are the two sides of the lower muley-blocks, and have straight perpendicular grooves *b′* in their inner surfaces, as seen in Fig. 6. *c* is the lower saw-buckle, and connects the saw C to the pivot-pin *d′* of the pitman. *e* is the pitman, bifurcated at its top end and journaled upon the wrist-pin *h* of the crank-wheel *f*, and has, at or near to its top end, and upon the outside of each limb of the bifurcated pitman, fulcrum or guide pins *d*, which pins *d* fit and freely slide in the grooves *b′* of the heads B′. *g* is the driving revolving shaft that gives motion to the crank-wheel *f* in the usual manner.

The side view, Fig. 2, shows the saw in the position that it has after it has made its downward stroke and is ready to rise, while in Figs. 3 and 4 other positions of the saw are shown.

The dotted lines in Fig. 3 show the bottom of the saw advanced, when one-eighth of the revolution of the crank-wheel has been made, which gives the saw, at the commencement of its downward stroke, a forward motion by reason of attaching the saw-buckle to the pitman below the fulcrum or guide pins; and in Fig. 4 the heavy broken lines *i* show the position of the saw when it is at its extreme upward reciprocation, with its upper end back from the perpendicular of the pivoted point, where it is connected to the pitman. The light broken lines *j* show the position of the saw when it has made one-half of its downward stroke, and the light whole lines *k* give the position of the saw when it has reached its full downward reciprocation.

The straight single inclines of the guides, as above described, are intended to define a different construction from what is known as "double inclines," or where the guides, on their faces, have two different angles of inclination in their length and each division of the inclination has the face of the guide or straight lines, but only extends half the length of the guide before the inclination is changed to a different angle, while in this invention the same angle of inclination extends the whole length of the guides.

By this arrangement of straight inclined upper guides operating together, with the connecting the saw to the pitman below or above the fulcrum or guide pins, which slide in perpendicular grooves, it will be seen that the bottom or lower teeth of the saw are first brought into contact with the timber, and as the saw reciprocates downward the succeeding teeth above come into contact with the timber in succession until the upper teeth become the last to strike the timber at the top of the log, thus distributing equally among all the teeth of the saw that are brought into the operation of cutting away the timber the labor and strain of the act of sawing, instead of having some of the teeth do double the work of others in cutting the timber, as is generally the case.

I lay no claim to the use of straight inclined guides above alone, or to the perpendicular straight slides below alone, or to the pivoting the saw to the pitman above or below the fulcrum or guide pins, as all of these have been used singly.

What I claim as my invention is—

1. The combination of the upper head, consisting of the slotted sides B B, plates *a a*, having the straight inclined guides *a′ a′*, laterally adjustable by set-screws, and cross-head $a^2$, substantially as described, and for the purpose set forth.

2. The combination of the slotted sides B B of the upper head and plates *a a*, having the straight inclined guides *a′ a′*, laterally adjustable by set-screws, and cross-head $a^2$, with the sides B′ B′ of the lower head, provided with the vertical grooves *b′*, and the bifurcated pitman *e*, carrying the lower cross-head of the saw, and the guide-pins *d d*, substantially as described, and for the purpose set forth.

3. The combination of the slotted sides B B of the upper head and plates *a a*, having the straight inclined guides *a′ a′*, laterally adjustable by means of set-screws, and cross-head $a^2$, with the pitman *e*, saw C, pivoted either above or below the noddle-pin or pitman-fulcrum, and vertical straight guides *b′*, substantially as described, and for the purpose set forth.

ASHBEL P. BARLOW.

Witnesses:
GEO. S. CLAPP,
H. STANLEY.